United States Patent
Paradise et al.

(12)

(10) Patent No.: US 6,588,815 B1
(45) Date of Patent: Jul. 8, 2003

(54) TRANSFER PRESS EMBODYING A PISTON-CYLINDER ASSEMBLY TO EFFECT GRIPPING ACTIVITY

(75) Inventors: Gregory Shawn Paradise, Auburn, IN (US); Richard Allen Lock, Albion, IN (US)

(73) Assignee: Legendary Engineering and Fabrication, Inc., Albion, IN (US)

( * ) Notice: Subject to any disclaimer, the term of this patent is extended or adjusted under 35 U.S.C. 154(b) by 0 days.

(21) Appl. No.: 09/626,062

(22) Filed: Jul. 26, 2000

Related U.S. Application Data

(60) Provisional application No. 60/145,874, filed on Jul. 27, 1999.

(51) Int. Cl.$^7$ .............................. B25J 3/04; B25J 15/00
(52) U.S. Cl. .................. 294/88; 294/103.1; 29/281.1; 269/32; 269/43; 269/246
(58) Field of Search ................. 294/88, 103.1, 294/104, 34, 82.34; 198/803.7; 414/17, 20, 18, 741; 269/20, 32, 27, 43, 71, 246; 901/32, 37, 39; 29/238, 281.1

(56) References Cited

U.S. PATENT DOCUMENTS

| 823,273 | A | * | 6/1906 | Hanna ........................ 269/32 |
|---|---|---|---|---|
| 2,052,976 | A | * | 9/1936 | Harcourt ..................... 269/32 |
| 2,212,332 | A | * | 8/1940 | Sitter et al. ................. 269/32 |
| 2,313,843 | A | * | 3/1943 | Shaff ......................... 269/32 |
| 2,354,841 | A | * | 8/1944 | Shaff ......................... 269/32 |
| 2,400,140 | A | * | 5/1946 | Sargeson ................. 294/103.1 |
| 3,189,340 | A | * | 6/1965 | Desel ......................... 269/20 |
| 3,257,141 | A | * | 6/1966 | Buus et al. ................. 294/65.5 |
| 3,552,743 | A | | 1/1971 | Baboz ....................... 271/268 |
| 3,698,065 | A | * | 10/1972 | Sorenson ..................... 29/238 |
| 3,891,204 | A | | 6/1975 | Mager ........................ 271/85 |
| 4,275,479 | A | * | 6/1981 | Korhonen .................... 294/88 |
| 4,284,301 | A | | 8/1981 | Geiger et al. ............... 294/104 |
| 4,425,073 | A | * | 1/1984 | Mattsson ................. 294/103.1 |
| 4,538,335 | A | * | 9/1985 | Moore, III ................... 29/238 |
| 4,545,715 | A | | 10/1985 | Seefeldt .................... 414/789.1 |
| 4,561,177 | A | * | 12/1985 | Rancer ........................ 29/238 |
| 4,572,564 | A | * | 2/1986 | Cipolla ....................... 269/32 |
| 4,588,070 | A | | 5/1986 | Smith ........................ 294/104 |
| 4,606,891 | A | * | 8/1986 | Murphy, Jr. et al. .......... 269/43 |
| 4,626,013 | A | * | 12/1986 | Barrows ...................... 294/88 |
| 4,643,415 | A | | 2/1987 | Kuehnert .................... 271/268 |
| 4,691,817 | A | | 9/1987 | Haar ........................ 198/468.2 |
| RE32,704 | E | * | 6/1988 | Schron et al. ................ 269/32 |
| 4,770,401 | A | * | 9/1988 | Donaldson .................. 269/246 |
| 4,784,381 | A | | 11/1988 | Prochut et al. .............. 271/268 |
| 4,896,086 | A | * | 1/1990 | Miyahara et al. .............. 269/20 |
| 4,975,015 | A | * | 12/1990 | Harding ...................... 414/411 |
| 5,001,911 | A | * | 3/1991 | Eck et al. .................... 68/242 |
| 5,018,776 | A | * | 5/1991 | Trygg ....................... 294/87.1 |
| 5,201,875 | A | * | 4/1993 | Tessier et al. ................ 294/88 |
| 5,287,610 | A | * | 2/1994 | Gomolak et al. ............. 29/281.1 |
| 5,752,693 | A | * | 5/1998 | Brisco ........................ 269/32 |
| 5,803,521 | A | * | 9/1998 | Zejda et al. .................. 294/88 |
| 5,853,208 | A | * | 12/1998 | Moskalik ..................... 294/88 |

FOREIGN PATENT DOCUMENTS

| JP | 0041144 | * | 3/1982 | ................. 269/32 |
|---|---|---|---|---|

\* cited by examiner

*Primary Examiner*—Christopher P. Ellis
*Assistant Examiner*—Paul T. Chin
(74) *Attorney, Agent, or Firm*—Randall J. Knuth

(57) ABSTRACT

A gripping device for use in a transfer press machine includes a jaw assembly having an upper jaw member and a lower jaw member disposed in fixed spaced-apart relationship to one another. A piston-cylinder assembly includes a cylinder element mounted on the upper jaw member and a piston element reciprocatingly housed within the cylinder element. The upper jaw member is provided with a bore passageway formed therethrough that opens into the clamping space. The piston-cylinder assembly is suitably mounted on the upper jaw member such that the piston element is displaceable therein and extensible into the clamping space defined between the jaw members. Suitably pressurizing the piston-cylinder assembly effects a displacement of the piston element into the clamping space which is sufficient to clamp a workpiece between the displaced piston element and the stationary lower jaw member.

8 Claims, 2 Drawing Sheets

TRANSFER PRESS EMBODYING A PISTON-CYLINDER ASSEMBLY TO EFFECT GRIPPING ACTIVITY

This application claims the benefit of provisional application No. 60/145,874, filed Jul. 27, 1999.

BACKGROUND OF THE INVENTION

1. Field of the Invention

The present invention relates to a gripping assembly for use in a transfer press machine, and, more particularly, to a piston-cylinder assembly that performs the clamping activity on workpiece material transferred into the handling area of a fixed jaw assembly.

2. Description of the Related Art

Gripping mechanisms installed in conventional transfer press machines are typically provided in the form of a pair of spaced-apart jaw members. Material such as metal sheets or other workpiece elements are fed or otherwise transferred by known carrier systems into the gripping space defined between the jaw members. The workpiece is secured by effecting relative movement between the jaw members until both jaw members are brought into contacting engagement with the workpiece in a manner sufficient to firmly hold it in place. Subsequent transfer of the workpiece takes place by releasing the jaw members from their clamping arrangement.

Repositioning of the jaw members into a clamping arrangement may be accomplished using a variety of actuating mechanisms. In one conventional system, the jaw members may be hingedly coupled to one another such that their relative orientation may be changed by pivoting one jaw member with respect to the other or by pivoting both jaw members. Alternatively, one or both of the jaw members may be slidably attached to a guiding frame structure which facilitates vertical displacement of the jaw members using a linear drive assembly. Conventional transfer presses therefore implement the clamping activity by suitably displacing one or both of the jaw members.

SUMMARY OF THE INVENTION

According to the present invention there is provided a gripping device for use in a transfer press machine comprising a jaw assembly that includes an upper jaw member and a lower jaw member disposed in fixed spaced-apart relationship to one another. The jaw members have a clamping space defined therebetween which receives a workpiece during a desired clamping activity. The gripping device further includes a piston-cylinder assembly having a cylinder element mounted on the upper jaw member at an upper surface thereof and a piston element reciprocatingly housed within the cylinder element. The upper jaw member is provided with a bore passageway formed therethrough that opens into the,clamping space. The piston-cylinder assembly is suitably mounted on the upper jaw member such that the piston element is disposed in axial registration with the bore passageway, enabling the piston element to be displaceable therein and extensible into the clamping space. An actuating mechanism preferably provided in the form of a pneumatic pressurizing device controllably pressurizes the piston-cylinder assembly in order to effectuate a displacement of the piston element sufficient to establish a clamping arrangement in which the workpiece is securably held between the lower jaw member and piston element. The holding pressure is released by relieving the pressurization level of the piston-cylinder assembly, which causes the piston element to retract into the cylinder housing until the next clamping activity begins. In one preferred form of the gripping device, there is provided a plurality of piston-cylinder assemblies (and corresponding bore passageways formed in the upper jaw member) to enable multiple clamping points to be selectively maintained on the workpiece.

The invention, in one form thereof, comprises a gripper assembly for use in handling a workpiece. The gripper assembly includes a jaw assembly comprising a first jaw member and a second jaw member disposed in fixed spaced-apart relationship to one another and defining a clamping space therebetween. At least one of the first jaw member and second jaw member includes at least one bore passageway formed therethrough which opens into the clamping space. The gripper assembly further includes at least one piston-cylinder assembly which respectively comprises a cylinder element and a piston element associated therewith. The piston element is operatively displaceable within a respective bore passageway associated with the jaw assembly and is extensible into the clamping space to enable selective engagement with the workpiece operatively disposed therein. There is further provided a means for operatively actuating the at least one piston-cylinder assembly.

The actuating means, in one form thereof, further comprises a pneumatic pressurization assembly.

One advantage of the present invention is that the gripper assembly provides a uniquely different form of clamping activity vis-a-vis conventional arrangements, namely by having a piston element reciprocatingly travel through the fixed upper jaw member into clamping arrangement with the fixed lower jaw member, as compared to the conventional approach of moving the jaw members toward one another.

Another advantage of the present invention is that the gripper assembly eliminates the need for any drive mechanisms attached to the jaw assembly since the jaw members are disposed in fixed spaced-apart relationship to one another.

A further advantage of the invention is that the actuating mechanism needed to effectuate the gripping action involves a simplified construction requiring only a pneumatic pressurization device, as distinguished from conventional arrangements that utilize more drive-type components and coupling pieces.

A yet further advantage of the invention is that the gripper assembly minimizes the number of parts needed to implement the clamping arrangement (i.e., the movable piston element secures the workpiece against the stationary lower jaw member), thereby providing a highly reproducible and precise clamping action.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
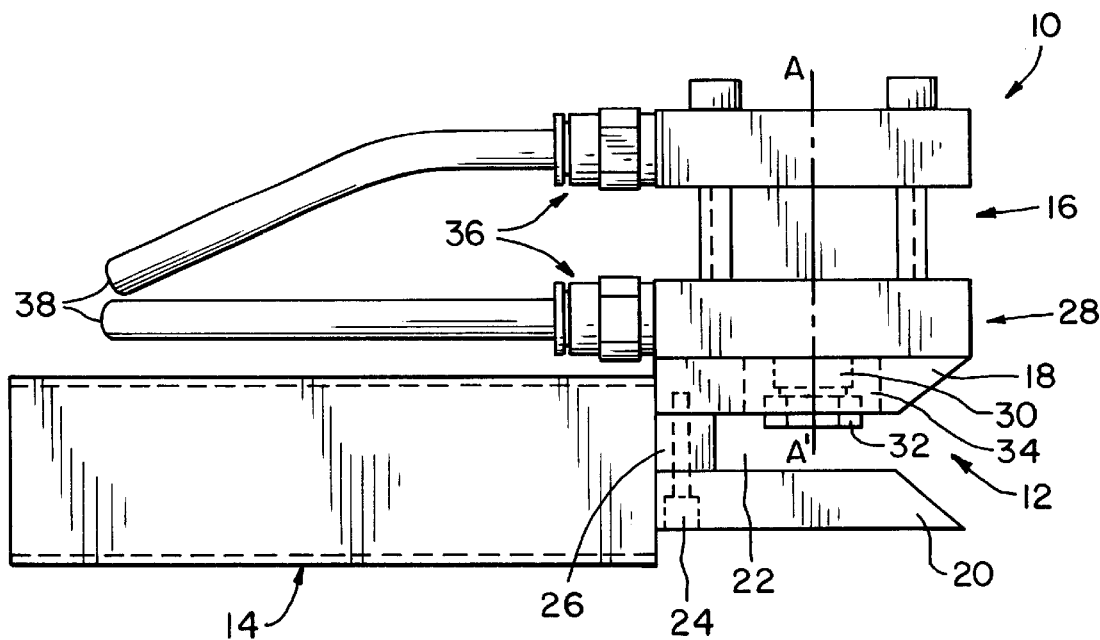
FIG. 1 is a lateral view of a gripper assembly for use in a transfer press machine in accordance with the present invention.

Referring now to the drawings and particularly to FIG. 1, there is shown a gripper assembly 10 for use in handling and otherwise securing a material or other such workpiece as part of the operation of a transfer press machine. The illustrated gripper assembly 10 includes a jaw assembly 12 integrally attached to a frame structure 14 and a piston-cylinder assembly 16 integrally associated with jaw assembly 12.

The illustrated jaw assembly 12 includes an upper jaw member 18 and a lower jaw member 20 disposed in fixed spaced-apart relationship to one another. Upper jaw 18 and lower jaw 20 define a clamping space 22 formed therebetween which is sufficient to accommodate the placement therein of a variety of workpiece materials incident to a gripping operation. Upper jaw 18 and lower jaw 20 are preferably provided as a single integral U-shaped piece. Additionally, jaw assembly 12 is preferably rigidly attached to frame structure 14. The spatial separation between upper jaw 18 and lower jaw 20 may be changed, however, in accordance with one aspect of the present invention by utilizing an adjustment mechanism which employs an adjustably rotatable screw (shown in phantom at 24) extending between upper jaw 18 and lower jaw 20 within transverse piece 26. Moreover, the attachment head of jaw assembly 12 is suitably formed to allow the jaw unit to be adaptably coupled to any type of transfer press machine. This adaptation feature allows the entire gripper assembly 10 to be provided in the form of an adjustably removable modular unit capable of installation on various machines. Accordingly, the gripper assembly 10 of the present invention may serve as a universal-type clamping mechanism.

The stationary aspect of upper jaw 18 and lower jaw 20 represents a significant feature of the present invention and distinguishes over conventional gripping mechanisms that require movement of the upper jaw and lower jaw relative to one another in order to effectuate the gripping action. As discussed below, the gripping action accomplished by the present invention does not involve any movement from either upper jaw 18 or lower jaw 20. Maintaining jaw assembly 12 in a stationary fixed orientation enables the individual jaw members to be constructed from thicker sturdier materials since there is no concern as to the influence such materials will have upon movement of the jaw members. By comparison, conventional jaw-based gripping devices may have various weight and dimensional restrictions owing to their potentially adverse effect upon the ability of the jaw members to be easily maneuvered into clamping position. As a result, gripper assembly 10 of the present invention affords greater flexibility in the area of designing jaw members which may be tailored to meet the particular demands or characteristics of the transfer press machine or operation.

The illustrated piston-cylinder assembly 16 includes a cylinder element 28 and an associated piston element 30 movably housed within cylinder 28. Piston 30 is preferably fitted with an end piece 32 which enhances the gripping ability of piston 30 when actuated. In accordance with one aspect of the present invention, upper jaw 18 includes a bore passageway 34 defined therein which extends from an upper surface to a lower surface thereof. This structural feature of upper jaw 18 serves as the means by which piston 30 can gain access into clamping space 22. More particularly, piston-cylinder assembly 16 is suitably mounted on upper jaw 18 such that piston 30 is registered in suitable alignment with bore passageway 34. For example, it may be preferable to provide piston 30 in axial alignment with bore passageway 34. It is apparent that bore passageway 34 must be properly dimensioned to accommodate the placement and travel of piston 30 therein. Cylinder 28 may preferably be provided in the form of a half-inch stroke pancake-type cylinder device such as those available from Grainger (e.g., Model #2A706). However, this particular implementation should not be construed in limitation of the present invention as it should be apparent that any type or form of piston-cylinder mechanism may be used.

Piston-cylinder assembly 16 is preferably provided in the form of a pneumatically pressurizable device which relies upon changes in pneumatic pressurization to adjustably displace the position of piston 30 relative to cylinder 28. For this purpose, piston-cylinder assembly 16 is illustratively provided with pneumatic inlet/outlet ports 36 which are coupled to pneumatic control tubes 38 that supply pressurized air and provide a return path for released air during de-pressurization. A controllable pressurized pneumatic supply (not shown) is suitably connected to control tubes 38. An electrically programmable solenoid (not shown) may be provided to regulate the amount of pressurized air supplied to piston-cylinder assembly 16. In one alternative implementation, piston-cylinder assembly 16 may be provided in the form of a hydraulically activatable device. However, it should be understood that the present invention encompasses the use of any type of actuating principle in connection with the appropriate piston-cylinder assembly.

Figure 2:
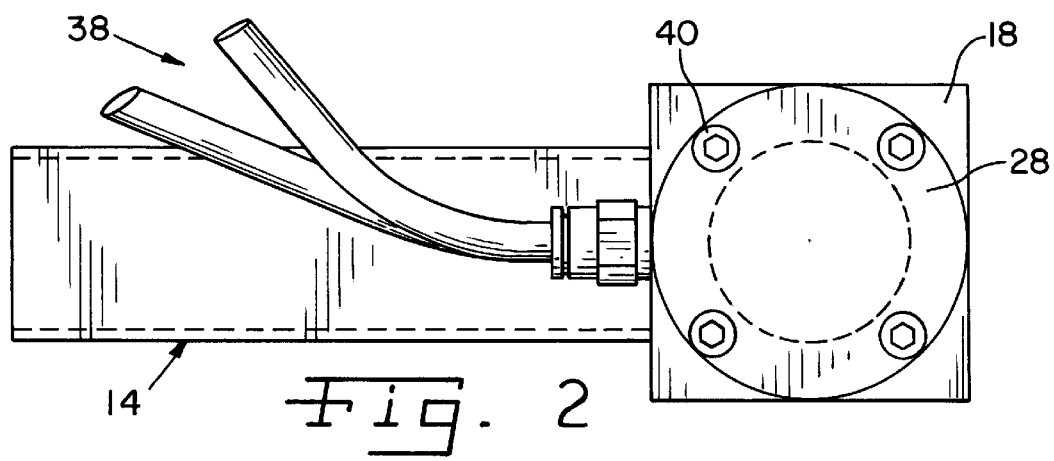
FIG. 2 is an upper planar view of the gripper assembly of FIG. 1 taken along line A–A' therein.
Figure 3:
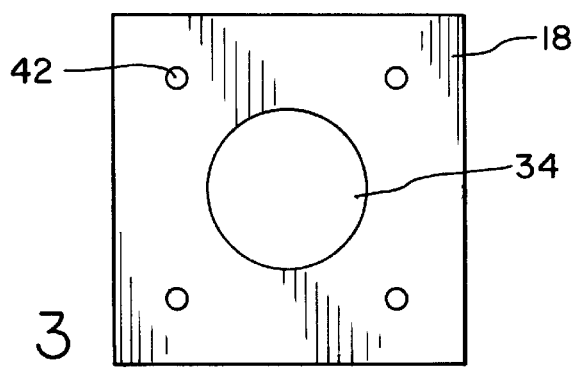
FIG. 3 is an upper planar view of the upper jaw for the gripper assembly of FIG. 1 illustrating the bore passageway formed therein to accommodate reciprocating travel of the piston element.

Referring to FIG. 2, which as shown an upper view of gripper assembly 10 taken along line A–A' of FIG. 1, cylinder 28 is securably mounted to upper jaw 18 using an arrangement of connection screws 40 circumferentially disposed about cylinder 28. However, it should be apparent that cylinder 28 may be attached or coupled to jaw assembly 12 using any suitable connection method. Referring to FIG. 3, which shows an upper plan view of upper jaw 18, there is provided a corresponding arrangement of screw-receiving slots 42 formed in upper jaw 18 for threadably receiving the arrangement of connection screws 40 to complete the mounting connection.

Figure 4:
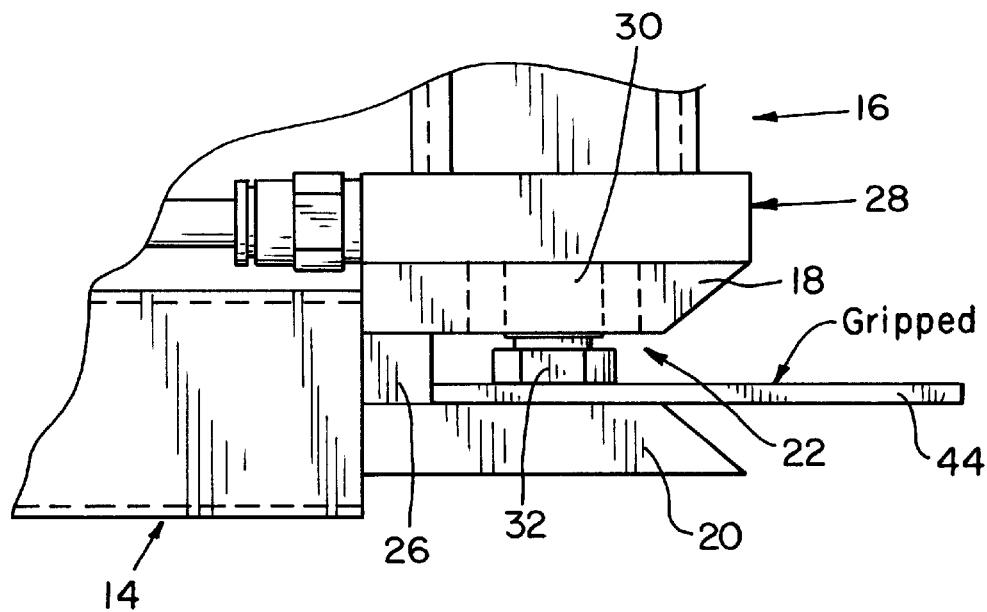
FIG. 4 is a lateral sectional view of the gripper assembly depicted in FIG. 1 illustrating the clamping arrangement between the movable piston element and fixed lower jaw.

Reference is now made to FIG. 4 to illustrate the manner in which gripper assembly 10 operates to clamp a workpiece such as illustrative stock material 44 that is fed or otherwise transported into clamping space 22. Material 44 initially may be positioned within clamping space 22 by sliding it along the upper surface of lower jaw 20 until it abuts against transverse piece 26, which therefore serves as a conveyance stop. Piston-cylinder assembly 16 is then controllably activated by generating therein a suitable degree of pneumatic pressurization which causes piston 30 to extend downwardly towards lower jaw 20 until it comes into contacting engagement with material 44, thereby establishing a clamping arrangement in which material 44 is interposed between piston end piece 32 and lower jaw 20. FIG. 4 illustrates the clamping condition which results from suitable extension of piston 30. The pressurization of piston-cylinder assembly 16 is sufficient to maintain a desired holding pressure that firmly secures material 44 between piston 30 and lower jaw 20.

One advantage of this type of clamping arrangement is that only a single component (i.e., piston 30) must be moved in order to establish the desired clamping arrangement. Reducing the number of moving parts in this manner helps to eliminate operating errors which arise due to the misalignment or malfunctioning of components. Additionally, the holding pressure exerted upon material 44 is highly controllable since the pneumatic pressurization of piston-cylinder assembly 16 can be precisely and accurately regulated. Material 44 is released from the illustrated clamping arrangement by suitably reducing the pressurization level of piston-cylinder assembly 16, thereby causing piston 30 to be retracted and drawn back into cylinder 28. This retracted condition is illustratively shown by FIG. 1.

Figure 5:
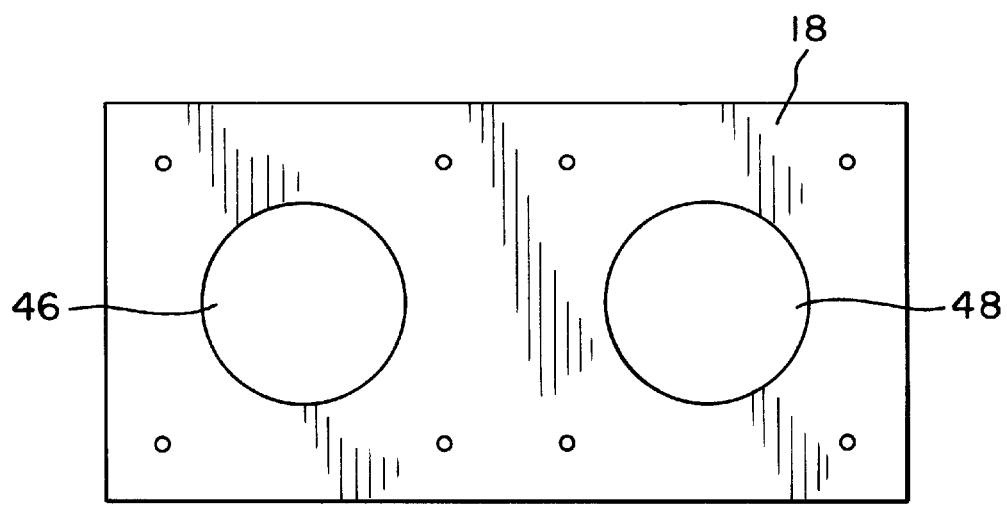
FIG. 5 is an upper sectional view of a gripper assembly in accordance with another embodiment of the present invention which employs a pair of piston-cylinder assemblies.

In accordance with another embodiment of the present invention, a plurality of discrete piston-cylinder assemblies may be used to provide a corresponding plurality of clamping contact points vis-a-vis material 44. For this purpose, upper jaw 18 will be appropriately constructed to include a sufficient number of bore passageways each capable of accommodating a respective one of the piston elements from the plural piston-cylinder assemblies. In a double-piston arrangement, for example, a pair of bore passageway (such as holes 46 and 48 in FIG. 5) will be machined through upper jaw 18. FIG. 5 shows an upper plan view of one such upper jaw 18 adapted for coupling to a pair of piston-cylinder assemblies. Alternatively, lower jaw 20 may be similarly adapted and provided with a respective set of piston-cylinder assemblies if it is desired to clamp material 44 to upper jaw 18 or to clamp material 44 between opposing piston elements which extend from respective piston-cylinder assemblies disposed at both the upper and lower jaws. When multiple piston-cylinder assemblies are used, the piston element can be activated in tandem via common pressurization of the respective cylinders or each piston-cylinder assembly can be individually pressurized to create a variable clamping-pressure profile across material 44.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An assembly for use in handling a workpiece, comprising:
   a frame member;
   a jaw assembly, said jaw assembly comprising a stationary first generally planar jaw member and a stationary second generally planar jaw member disposed in fixed spaced-apart relationship to one another and defining at least in part a clamping space therebetween, said first jaw member and said second jaw member being rigidly mounted proximate to said frame member, at least one of said first jaw member and said second jaw member having at least one bore passageway formed therethrough opening into said clamping space, at least one of said first jaw member and said second jaw member engagable with the workpiece;
   at least one piston-cylinder assembly respectively comprising a cylinder element and a piston element associated therewith, said piston element being operatively displaceable within said respective bore passageway associated with said jaw assembly and extensible into said clamping space to enable selective engagement with the workpiece operatively disposed therein; and
   means for operatively actuating said at least one piston-cylinder assembly.

2. The assembly as recited in claim 1, wherein said actuating means further comprises:
   a pneumatic pressurization assembly.

3. An assembly for use in handling a workpiece, comprising:
   a frame member;
   a jaw assembly, said jaw assembly comprising a stationary first jaw member and a stationary second jaw member disposed in fixed spaced-apart relationship to one another and defining a clamping space therebetween, said first jaw member and said second jaw member being rigidly mounted proximate to said frame member, at least one of said first jaw member and said second jaw member having at least one bore passageway formed therein, at least one of said first jaw member and said second jaw member engagable with the workpiece;
   at least one piston element, said piston element being operatively displaceable within said bore passageway and extensible into said clamping space to enable selective engagement with the workpiece disposed therein; and
   means for displacing said piston within said bore passageway.

4. The assembly as recited in claim 3, wherein said displacing means utilizes pressure to displace said piston.

5. The assembly as recited in claim 4, wherein said displacing means is a pneumatic assembly.

6. A gripping assembly for handling a workpiece, comprising:
   a frame member;
   a jaw assembly, said jaw assembly comprising a stationary first generally planar jaw member and a stationary second generally planar jaw member being parallel and having a spaced-apart relationship relative to one another, and defining at least in part a clamping space there between, said first jaw member and said second jaw member being rigidly mounted proximate to said frame member, at least one of said first jaw member and said second jaw member engagable with the workpiece;
   a first of said generally planar jaw members having a bore passage; and
   a movable piston movable relative to said first generally planar jaw member through said bore, said piston being provided with a cylinder for driving said piston to move towards a second of said generally planar jaw members, and to engage a workpiece operably disposed between said generally planar jaw members, with said piston holding the workpiece against said second generally planar jaw member, and said piston having a surface area which is less than a surface area of said second generally planar jaw member.

7. The assembly of claim 1, further comprises an adjustment mechanism operatively associated with each of said first jaw member and said second jaw member, said adjustment mechanism being configured for controlling a spatial separation between said first jaw member and said second jaw member.

8. The assembly of claim 7, wherein said adjustment mechanism is an adjustment screw.

* * * * *